United States Patent
Solanki et al.

(12)

(10) Patent No.: US 11,734,594 B1
(45) Date of Patent: Aug. 22, 2023

(54) STATE MONITORING SYSTEM

(71) Applicant: SAS Institute Inc., Cary, NC (US)

(72) Inventors: Rajendra Singh Solanki, Cary, NC (US); Jie Zhong, Cary, NC (US); Elaine Kearney Kowalewski, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/053,415

(22) Filed: Nov. 8, 2022

Related U.S. Application Data

(60) Provisional application No. 63/407,466, filed on Sep. 16, 2022, provisional application No. 63/405,734, filed on Sep. 12, 2022.

(51) Int. Cl.
*G06N 7/01* (2023.01)

(52) U.S. Cl.
CPC .................................. *G06N 7/01* (2023.01)

(58) Field of Classification Search
CPC ............ G06N 7/01; G06N 3/04; G06N 20/10; G06V 10/763; G06V 10/82; G06V 40/23; G06F 18/2321
See application file for complete search history.

(56) References Cited

U.S. PATENT DOCUMENTS

2015/0195149 A1* 7/2015 Vasseur ............... H04L 47/2425 370/252
2022/0172091 A1* 6/2022 Wasserkrug ............. G06N 7/01

OTHER PUBLICATIONS

Downs, James J., and Ernest F. Vogel. "A plant-wide industrial process control problem." Computers & chemical engineering 17.3 (1993): 245-255.
SAS® Visual Data Mining and Machine Learning: Programming Guide. Aug. 18, 2022. Cary, NC: SAS Institute Inc. pp. 1-74.
Koller, Daphne, and Nir Friedman. Probabilistic graphical models: principles and techniques. MIT press, 2009. pp. 1-1270.
Lauritzen, Steffen L., and David J. Spiegelhalter. "Local computations with probabilities on graphical structures and their application to expert systems." Journal of the Royal Statistical Society: Series B (Methodological) 50.2 (1988): 157-194.
Lerner, Uri, et al. "Bayesian fault detection and diagnosis in dynamic systems." Aaai/iaai. Aug. 2000. pp. 1-7.

* cited by examiner

*Primary Examiner* — Manuel A Rivera Vargas
(74) *Attorney, Agent, or Firm* — Bell & Manning, LLC

(57) ABSTRACT

A computer monitors a state of a system. A time branch is defined for each valid value of each discrete variable. A system model is executed with observed values to update each time branch and determine a probability associated with each time branch. A discrete variable is selected, and a sequence duration value is incremented. When the incremented sequence duration value is greater than a predefined minimum sequence duration value, a probability change value is computed for the discrete variable, and, when the computed probability change value is less than or equal to a synchronization probability change value, a continuous value for each continuous variable for each time branch of the discrete variable is synchronized, and the sequence duration value for the selected discrete variable is reinitialized. The continuous value for at least one non-observed continuous variable is output.

30 Claims, 7 Drawing Sheets

STATE MONITORING SYSTEM

CROSS-REFERENCE TO RELATED APPLICATIONS

The present application claims the benefit of and priority under 35 U.S.C. § 119(e) to U.S. Provisional Patent Application No. 63/405,734 filed Sep. 12, 2022 and to U.S. Provisional Patent Application No. 63/407,466 filed Sep. 16, 2022, the entire contents of which are hereby incorporated by reference.

BACKGROUND

A dynamic Bayesian network (DBN) models the relationships between probabilistic variables over discrete points of time. Evolution of variables as a function of time may be based on their past values and/or a relationship to other variables observed or unknown (hidden). A variable that evolves in time is represented in each discrete point of time with a probabilistic distribution specific to that time. A typical application of a DBN model is an industrial process with known relationships among the variables where a belief in a value of a hidden variable may vary based on a fault that can occur in the process over time. A fault state may be represented by a discrete variable value. For example, fault states in an industrial process may indicate a failure in a component such as a blocked valve, a failed sensor, etc., a crack causing a leak, etc. Another illustrative application of a DBN model is a discrimination process that determines whether a tracked object is a missile or a plane.

The presence of a mix of discrete and continuous probabilistic variables creates unique challenges in filtering algorithms used to compute a distribution of the hidden variables over time. Discrete type variables may also be referred to as nominal type variables, and continuous type variables may also be referred to as interval variable type variables. Each valid value of a discrete variable may lead to a different distribution model for a continuous variable. For example, the continuous variable may be modeled differently in the presence of a fault condition relative to a no-fault condition. A model of the continuous variable under specific conditions may be a system of ordinary differential equations that may or may not be approximated, may be a linear function, or a non-linear function. For example, the equations or functions may represent a chemical reaction, a fluid flow, an object's movement, etc. The output of the model is a mean value or a derivative value that is used to define the value for the continuous variable and a standard deviation value associated with the expectation of the mean value that represents the model noise. The valid number of discrete value settings may result in an exponentially large number of discrete variable values to consider though. For example, ten discrete variables representing different valid fault conditions with two valid values of fault or no-fault for each fault condition results in $2^{10}$ valid combinations of discrete value settings. Such a large number of discrete combinations leads to two problems: 1) memory requirements and computation times may exceed reasonable limits; and 2) the probability of each setting becomes very small such that a large number of settings become indistinguishable from each other making it difficult to identify the setting that is present at each time.

SUMMARY

In an example embodiment, a computer-readable medium is provided having stored thereon computer-readable instructions that when executed by a computing device, cause the computing device to monitor a state of a system. A time branch is defined for each valid value of each discrete variable of a plurality of non-observed discrete variables. An indicator of a discrete variable and a value of the discrete variable are associated with each respective time branch. There are at least two valid values for each discrete variable of the plurality of non-observed discrete variables. Each time branch maintains a model of a value of a non-observed continuous variable of a plurality of non-observed continuous variables as a function of time based on the value of a respective discrete variable. A sequence duration value is initialized for each discrete variable of the plurality of non-observed discrete variables. (A) A system model is executed with observed values of observed variables to update each time branch by projecting each non-observed continuous variable of the plurality of non-observed continuous variables based on the model of the non-observed continuous variable that is associated with each valid value of at least one discrete variable of the plurality of non-observed discrete variables. The system model describes operation of a system and defines a relationship among the observed variables, the plurality of non-observed continuous variables, and the plurality of non-observed discrete variables. Execution of the system model determines a probability associated with each defined time branch that indicates a likelihood that the value of the discrete variable associated with each defined time branch is correct. (B) A discrete value is defined for each non-observed discrete variable of the plurality of non-observed discrete variables as the valid value of the discrete variable associated with the defined time branch having a highest probability value among the probabilities determined for each discrete variable. (C) A continuous value is defined for each non-observed continuous variable using the variable model associated with the defined time branch having the highest probability value. (D) A discrete variable is selected from the plurality of non-observed discrete variables. (E) The sequence duration value is incremented for the selected discrete variable. (F) When the incremented sequence duration value is greater than a predefined minimum sequence duration value, a probability change value is computed for the selected discrete variable, and, when the computed probability change value is less than or equal to a predefined synchronization probability change value, the continuous value for each non-observed continuous variable for each time branch of the selected discrete variable is synchronized to have the continuous value defined in (C), and the sequence duration value for the selected discrete variable is reinitialized. (G) (D) through (F) are repeated with each remaining discrete variable of the plurality of non-observed discrete variables. (H) The defined continuous value for at least one non-observed continuous variable of a plurality of non-observed continuous variables is output. (I) A new observed value is received for at least one observed variable of the observed variables. (A) through (I) are repeated with the received new observed value to replace a previous observed value of the observed values of at least one observed variable of the observed variables.

In another example embodiment, a computing device is provided. The computing device includes, but is not limited to, a processor and a computer-readable medium operably coupled to the processor. The computer-readable medium has instructions stored thereon that, when executed by the processor, cause the computing device to monitor a state of a system.

In yet another example embodiment, a method of monitoring a state of a system is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
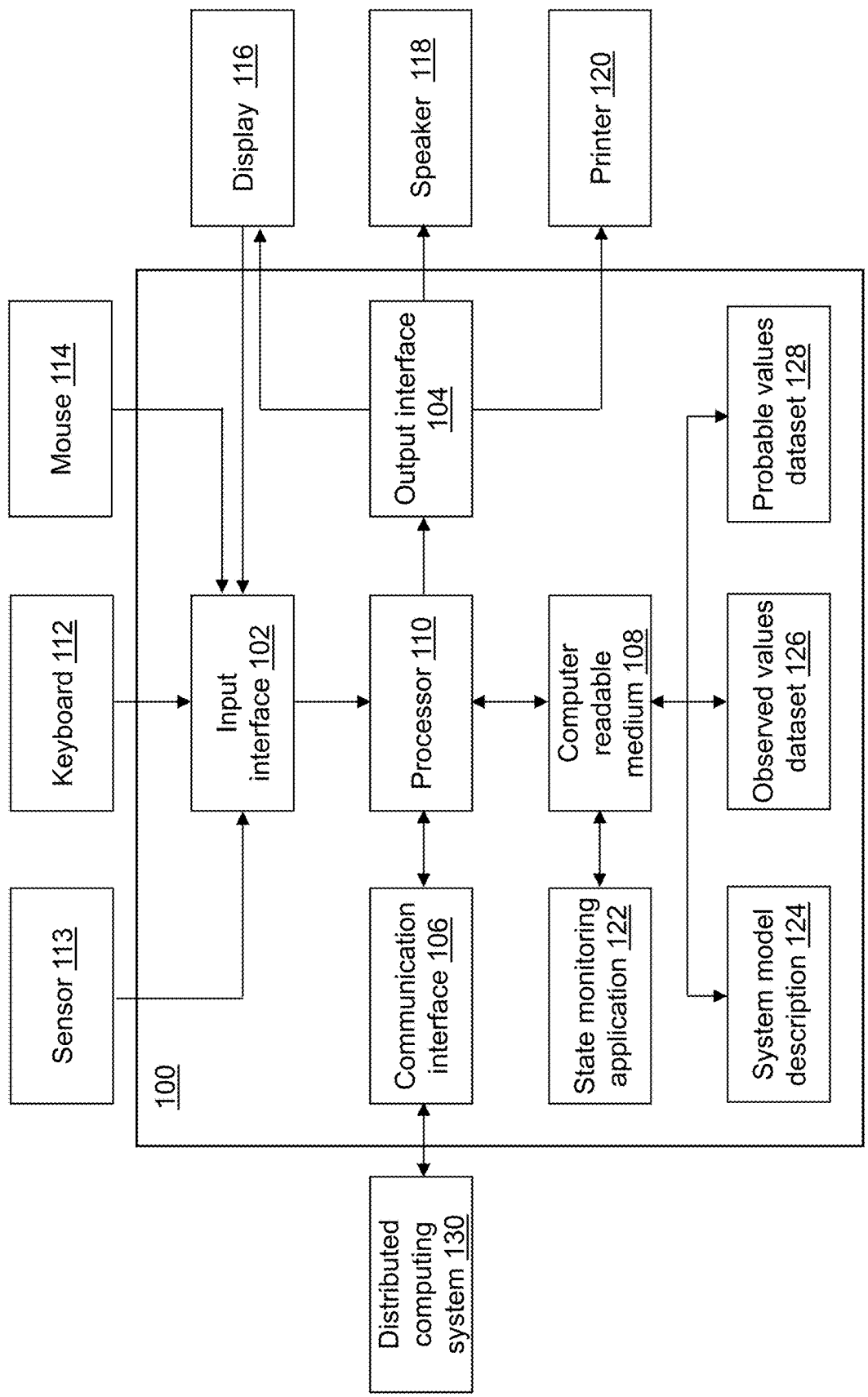
FIG. 1 depicts a block diagram of a state monitoring device in accordance with an illustrative embodiment.

A dynamic Bayesian network (DBN) models the relationships between probabilistic variables over discrete points of time. Evolution of variables as a function of time may be based on their past values and/or a relationship to other variables observed or unknown also referred to as non-observed or hidden. The dependencies (relationships) among the variables are captured in a structure of the network. The network consists of directed arcs where a child variable in an arc is a function of a parent variable in that arc. Multiple arcs pointing to a child variable represent a model of the child variable as a function of the parent variables of these arcs. The parent variables can be a mix of variables in the current time and the previous time. For example, at a current time t, a value $v1_t$ of a first variable v1 may be a function of a value $v1_{t-1}$ of the first variable v1 at a previous time, a value $v2_{t-1}$ of a second variable v2 at the previous time, and a value $v3_t$ of a third variable v3 at the current time.

Parent variables in a function can be a mix of discrete and continuous probabilistic variables. The child variable is a continuous variable. The continuous variables may be a mix of hidden variables and observed variables. For example, observed variables may be associated with sensor measurements obtained during operation of a system. The discrete variables also may be a mix of hidden variables, such as a condition of the system, and observed variables, such as control variables that are set externally, for example, based on a switch state. Dependent on the specific network structure, child variables of a subset of parent variables may be a parent variable of another child variable, for example, forming a subsystem of the overall system. A model, such as an ordinary differential equation or a linear or non-linear function, is defined for each continuous variable that is a child in the Bayesian network. The model of the child variable can be expressed as a conditional distribution of the child variable for given values of parent variables. Different settings of discrete parent variable(s) may use different models for the continuous child variable as functions of its discrete parent variables.

The DBN model determines the distribution of hidden variables at the current time, termed as the belief of the hidden variables, given a belief in the hidden variable value from a previous time, a model specified by the network relating the variables in the previous time and the current time, and the observed variable values in the current time. This determination is also termed filtering to arrive at the belief in the value of the hidden variables at the current time. The belief determination process is repeated as a function of time to filter updated beliefs as time proceeds. A variable that evolves in time is represented in each discrete point of time with a probabilistic distribution specific to that time. The belief represents a most probable value of the hidden variable based on current observed values and previous values of the hidden variable.

A number of algorithms are available for computing the distribution of each hidden variable as a function of time. For example, the book by Daphne Koller and Nir Friedman titled *Probabilistic Graphical Models: Principles and Techniques* and published in 2009 by the MIT Press Cambridge, Massachusetts describes various probabilistic models. A paper by S. L. Lauritzen and D. J. Spiegelhalter titled *Local Computations with Probabilities on Graphical Structures and Their Application to Expert Systems* and published in the Journal of the Royal Statistical Society volume 50, number 2, pages 157-224 in 1988 describes a Lauritzen-Spiegelhalter algorithm that is an example of an exact algorithm for filtering to determine updated beliefs at each discrete point of time using a network of continuous variables. The Lauritzen-Spiegelhalter algorithm processes the network to produce a tree where each node in the tree is obtained by merging the original variables to satisfy specified mathematical properties. A two-pass procedure on this tree produces the beliefs in the hidden continuous variables at the current time.

As stated previously, the presence of a mix of discrete and continuous probabilistic variables creates unique challenges in the filtering algorithms used to compute a distribution of the hidden variables over time. Each valid value of a discrete variable may lead to a different distribution model for a continuous variable that changes as a function of time. The distribution models assist in identifying the settings of hidden discrete variables, but require a potential enumeration of an exponentially large number of discrete variable settings. A setting of the discrete variables is termed as a branch in enumeration logic for the distribution models.

Figure 2:
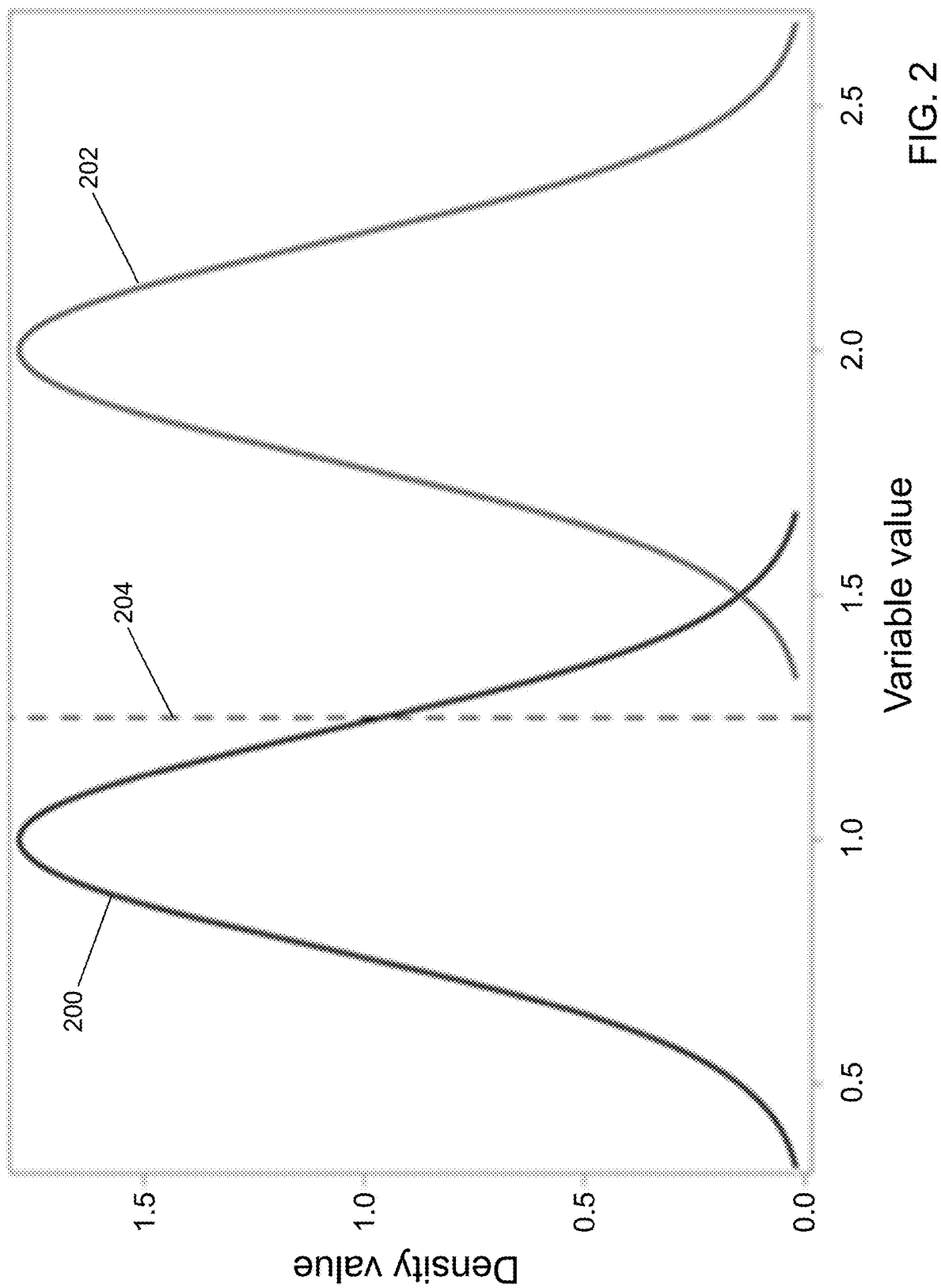
FIG. 2 depicts two different distribution models for a continuous variable in accordance with an illustrative embodiment.

Using an observed value to distinguish between branches is illustrated by a simple example presented in FIG. 2 for a continuous variable. The continuous variable has a first distribution curve 200 based on a first value of a discrete variable and a second distribution curve 202 based on a second value of the discrete variable. An observed value line 204 indicates an observed value of the continuous variable at a current time. If the observed value of the continuous variable is closer to first distribution curve 200, the probability of the first value of the discrete variable increases relative to the second value of the discrete variable. If the observed value of the continuous variable is closer to second distribution curve 202, the probability of the second value of the discrete variable increases relative to the first value of the discrete variable.

Traditional approaches to resolve the enumeration problem use pruning techniques to remove branches with insignificant probabilities from the mix of possibilities. Since the probabilities of a branch can change depending on the state of the discrete variables over time, any pruning has to be done judiciously to allow the low probability branches to gain in probability as time proceeds. For illustration, a paper by Uri Lerner, et al. titled *Bayesian Fault Detection and Diagnosis in Dynamic Systems* and published In Proceedings of the Seventeenth National Conference on Artificial Intelligence and Twelfth Conference on Innovative Applications of Artificial Intelligence at pages 531-537 by the American Association for Artificial Intelligence in 2000 (Lerner) proposes a mix of pruning and collapsing, where collapsing involves building an aggregate branch by merging several proximate branches using a weighting scheme. If branches still exceed a desired count, all remaining branches are collapsed into a single last branch.

Additionally, the changing values of discrete variables over time in the context of a single discrete variable creates challenges in the filtering algorithms. One valid history of the discrete variable up to time t is given by a sequence of $N_t$ values where each value is taken from the valid values for the discrete variable. Thus, the total number of valid sequences for the variable over $N_t$ time periods is $d^{N_t}$, where d indicates a number of the valid values for the discrete variable.

Each sequence yields a unique history of the discrete variable and produces a different distribution of the continuous variables based on this history. Hence, an exhaustive enumeration of the valid sequences requires an exponential increase in the number of possibilities with time.

Using an observed value to distinguish between sequences can also be illustrated in FIG. 2 for a continuous variable with two different distributions based on two different historical sequences of the discrete variable. If the observed value of the continuous variable, represented by observed value line 204, is closer to first distribution curve 200 for a first sequence of the discrete variable, the probability of the first value of the discrete variable increases relative to the second value of the discrete variable for a second sequence of the discrete variable represented by second distribution curve 202.

A state monitoring application 122, shown referring to FIG. 1, implements a branching scheme that resolves the enumeration problem that results due to many discrete variables and/or due to long sequences of time. Using state monitoring application 122, a time branch is defined for each level of each discrete variable. Thus, for $N_d$ discrete variables with $d_1, d_2, \ldots, d_{N_d}$ valid values for each respective discrete variable, the total number of time branches is $\Sigma_i^{N_d} d_i$ with a time branch defined for each discrete variable and valid value pair. Instead of allowing each time branch to continue to grow with time, state monitoring application 122 synchronizes and resets the time branches when a discrete variable value is determined to be stable.

Referring to FIG. 1, a block diagram of a state monitoring device 100 is shown in accordance with an illustrative embodiment. State monitoring device 100 may include an input interface 102, an output interface 104, a communication interface 106, a non-transitory computer-readable medium 108, a processor 110, state monitoring application 122, system model description 124, observed values dataset 126, and a probable values dataset 128. State monitoring application 122 monitors a state of a system modeled using system model description 124 based on observed values received as a function of time to predict a most probable value for each hidden variable. For example, the monitoring may provide values for an otherwise unknown system parameter as a function of time as well as occurrence of one or more events, such as faults. Fewer, different, and/or additional components may be incorporated into state monitoring device 100.

Input interface 102 provides an interface for receiving information from the user or another device for entry into state monitoring device 100 as understood by those skilled in the art. Input interface 102 may interface with various input technologies including, but not limited to, a keyboard 112, a sensor 113, a mouse 114, a display 116, a track ball, a keypad, one or more buttons, etc. to receive sensor data from another device or to allow the user to enter information into state monitoring device 100 or to make selections presented in a user interface displayed on display 116.

Sensor 113 may measure a physical quantity in an environment to which sensor 113 is associated and generate a corresponding measurement datum that may be associated with a time that the measurement datum is generated. The measurement datum may be stored in observed values dataset 126 or streamed to state monitoring device 100. Illustrative sensors include a position sensor, a velocity sensor, an acceleration sensor, a temperature sensor, a pressure sensor, a flow rate sensor, a heart rate sensor, a blood pressure sensor, a blood glucose sensor, a chemical sensor, etc.

The same interface may support both input interface 102 and output interface 104. For example, display 116 comprising a touch screen provides a mechanism for user input and for presentation of output to the user. State monitoring device 100 may have one or more input interfaces that use the same or a different input interface technology. The input interface technology further may be accessible by state monitoring device 100 through communication interface 106.

Output interface 104 provides an interface for outputting information for review by a user of state monitoring device 100 and/or for use by another application or device. For example, output interface 104 may interface with various output technologies including, but not limited to, display 116, a speaker 118, a printer 120, etc. State monitoring device 100 may have one or more output interfaces that use the same or a different output interface technology. The output interface technology further may be accessible by state monitoring device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. State monitoring device 100 may have one or more communication interfaces that use the same or a different communication interface technology. For example, state monitoring device 100 may support communication using an Ethernet port, a Bluetooth antenna, a telephone jack, a USB port, etc. Data and/or messages may be transferred between state monitoring device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. State monitoring device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. State monitoring device 100 also may have one or more drives that support the loading of a memory media such as a CD, DVD, an external hard drive, etc. One or more external hard drives further may be connected to state monitoring device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. State monitoring device 100 may include a plurality of processors that use the same or a different processing technology.

Some processes may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

State monitoring application 122 performs operations associated with monitoring a system modeled using system model description 124 based on observed values received as a function of time to predict a most probable state of each hidden variable. The observed values may be stored in observed values dataset 126 or received from sensor 113 directly and/or through a device of distributed computing system 130. State monitoring application 122 may be used to predict a value or belief in a value for each hidden variable that may be stored in probable values dataset 128, presented on display 126, sent to another computing device of distributed computing system 130, etc. A probability may be associated with each predicted value. Some or all of the operations described herein may be embodied in state monitoring application 122. The operations may be implemented using hardware, firmware, software, or any combination of these methods.

Referring to the example embodiment of FIG. 1, state monitoring application 122 is implemented in software (comprised of computer-readable and/or computer-executable instructions) stored in computer-readable medium 108 and accessible by processor 110 for execution of the instructions that embody the operations of state monitoring application 122. State monitoring application 122 may be written using one or more programming languages, assembly languages, scripting languages, etc. State monitoring application 122 may be integrated with other analytic tools. As an example, state monitoring application 122 may be part of an integrated data analytics software application and/or software architecture such as that offered by SAS Institute Inc. of Cary, N.C., USA. Merely for illustration, state monitoring application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

State monitoring application 122 may be implemented as a Web application. For example, state monitoring application 122 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language file, or any other type of file supported by HTTP.

In data science, engineering, and statistical applications, data often consists of multiple measurements (across sensors, characteristics, responses, etc.) collected across multiple time instances (patients, test subjects, etc.). These measurements may be collected in observed values dataset 126 for analysis and processing or streamed to state monitoring device 100 as they are generated. Observed values dataset 126 may include data captured as a function of time for one or more physical objects. The data stored in observed values dataset 126 may be captured at different time points periodically, intermittently, when an event occurs, etc. Observed values dataset 126 may include data captured at a high data rate such as 200 or more observation vectors per second for one or more physical objects. One or more columns of observed values dataset 126 may include a time and/or date value. Observed values dataset 126 may include data captured under normal and abnormal operating conditions of the physical object.

Observed values dataset 126 may include, for example, a plurality of rows and a plurality of columns. The plurality of rows may be referred to as observation vectors or records (observations), and the columns may be referred to as variables. The observed variables define a vector $x_i$ for each observation vector $i=1,2, \ldots, N$, where N is a number of the observation vectors included in observed values dataset 126. Observed values dataset 126 may include additional variables that are not included in the plurality of variables.

One or more variables of the plurality of variables may describe a characteristic of the physical object. For example, if observed values dataset 126 includes data related to operation of a vehicle, the variables may include a type of vehicle, an oil pressure, a speed, a gear indicator, a gas tank level, a tire pressure for each tire, an engine temperature, a radiator level, etc. that are a mix of discrete and continuous variables.

Alternatively, each row of observed values dataset 126 may include a value of an observed variable, an indicator of the observed variable, and a time at which the value was observed instead of including values for each observed variable. For example, sensor readings may be received from each sensor at different time points that may be periodic at the same or different frequencies or intermittent. The vector $x_i$ may be updated with a new value for only the indicated observed variable as each row of observed values dataset 126 is read.

The data stored in observed values dataset 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in observed values dataset 126 may be generated as part of the Internet of Things (IoT), where things (e.g., machines, devices, phones, sensors) can be connected to networks and the data from these things collected and processed within the things and/or external to the things before being stored in observed values dataset 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in observed values dataset 126.

Observed values dataset 126 may be stored on computer-readable medium 108 or on one or more computer-readable media of distributed computing system 130 and accessed by state monitoring device 100 using communication interface 106, input interface 102, and/or output interface 104. Observed values dataset 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Observed values dataset 126 may be stored using various data structures as known to those skilled in the art including one or more files of a file system, a relational database, one or more tables of a system of tables, a structured query language database, etc. on state monitoring device 100 or on distributed computing system 130. State monitoring device 100 may coordinate access to observed values dataset 126 that is distributed across distributed computing system 130 that may include one or more computing devices. For example, observed values dataset 126 may be stored in a cube distributed across a grid of computers as understood by a person of skill in the art. As another example, observed values dataset 126 may be stored in a multi-node Hadoop® cluster. For instance, Apache™ Hadoop® is an open-source software framework for distributed computing supported by the Apache Software Foundation. As another example, observed values dataset 126 may be stored in a cloud of computers and accessed using cloud computing technologies, as understood by a person of skill in the art. The SAS® LASR™ Analytic Server may be used as an analytic platform to enable multiple users to concurrently access data stored in observed values dataset 126. The SAS Viya open, cloud-ready, in-memory architecture also may be used as an analytic platform to enable multiple users to concurrently access data stored in observed values dataset 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 3A:
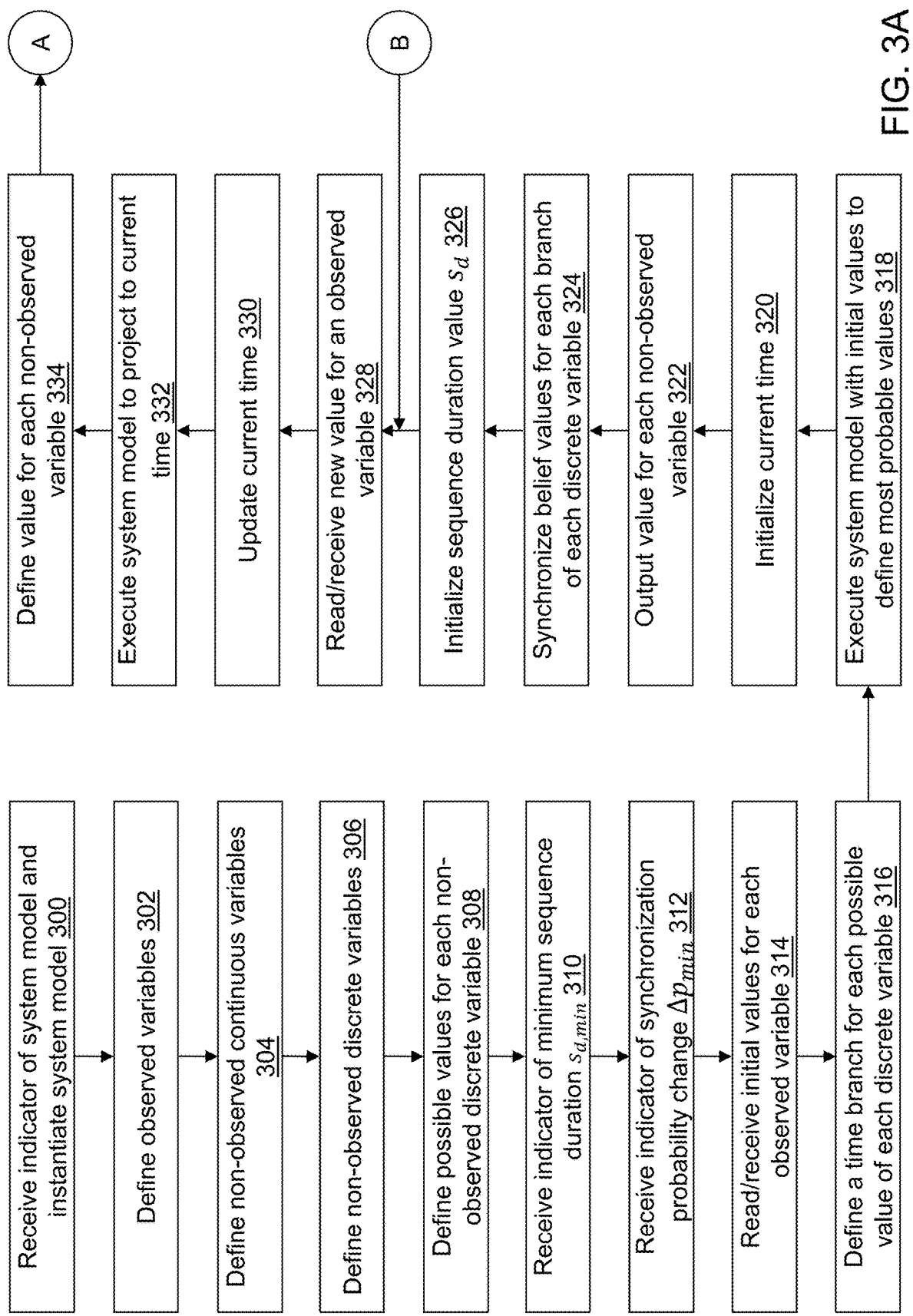
FIGS. 3A and 3B depict a flow diagram illustrating examples of operations performed by a state monitoring application of the state monitoring device of FIG. 1 in accordance with an illustrative embodiment.
Figure 3B:
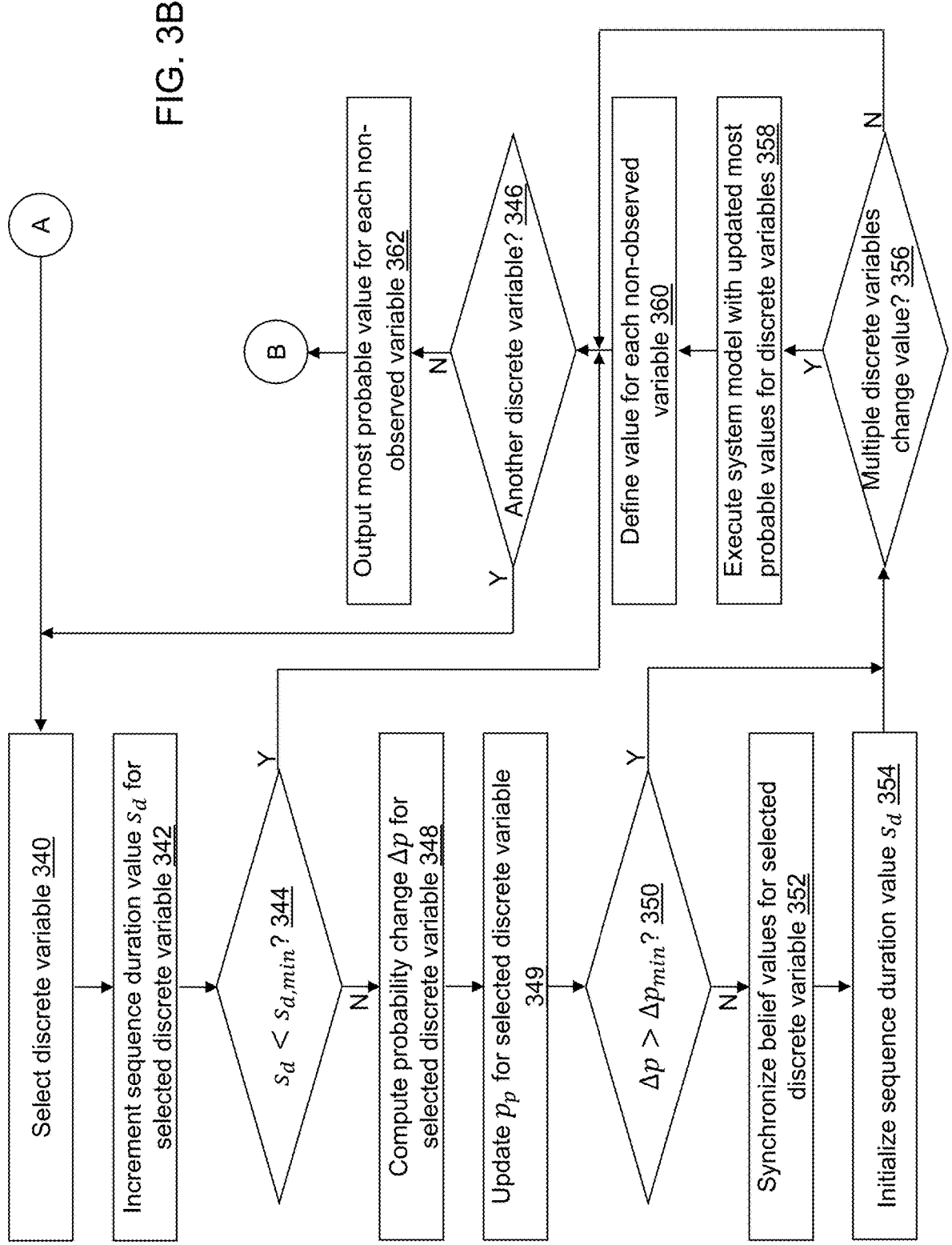

Referring to FIGS. 3A and 3B example operations associated with state monitoring application 122 are described. The operations associated with state monitoring application 122 may be executed by an ESPE using observed values that are streamed to state monitoring device 100 and possibly streaming the probable values of one or more of the hidden variables. Additional, fewer, or different operations may be performed depending on the embodiment of state monitoring application 122. The order of presentation of the operations of FIGS. 3A and 3B is not intended to be limiting. Some of the operations may not be performed in some embodiments. Although some of the operational flows are presented in sequence, the various operations may be performed in various repetitions and/or in other orders than those that are illustrated. For example, a user may execute state monitoring application 122, which causes presentation of a first user interface window, which may include a plurality of menus and selectors such as drop-down menus, buttons, text boxes, hyperlinks, etc. associated with state monitoring application 122 as understood by a person of skill in the art. The plurality of menus and selectors may be accessed in various orders. An indicator may indicate one or more user selections from a user interface, one or more data entries into a data field of the user interface such as a text box or a control window, one or more data items read from computer-readable medium 108, or otherwise defined with one or more default values, etc. that are received as an input by state monitoring application 122. The operations of state monitoring application 122 further may be performed in parallel using a plurality of threads and/or a plurality of worker computing devices of distributed computing system 130.

Referring to FIG. 3A, in an operation 300, a first indicator may be received that indicates system model description 124. For example, the first indicator indicates a location and a name of system model description 124. As an example, the first indicator may be received by system model description 124 after selection from a user interface window or after entry by a user into a user interface window. In an alternative embodiment, system model description 124 may not be selectable. For example, a most recently created system model may be used automatically. System model description 124 may describe a DBN that includes statistical models for each non-observed variable and that defines the network relationship between the system variables that include non-observed variables and observed variables. A system model may be instantiated from the model description read from system model description 124.

In an operation 302, the observed variables are defined. For example, the observed variables may be defined from system model description 124 or from a first row of observed values dataset 126. As stated previously, observed values dataset 126 may include a value of the observed variable, an indicator of the observed variable, and a time at which the value was observed. To populate an observation vector at the time at which the value was observed, previous values of observed variables other than the indicated observed variable may remain at the previous value.

In an operation 304, the non-observed continuous variables are defined. For example, the non-observed continuous variables may be defined from system model description 124. Each non-observed continuous variable may be a child variable in the system network. A child variable of one portion of the system network may be a parent variable to another child variable of another portion of the system network.

In an operation 306, the non-observed discrete variables are defined. For example, the non-observed discrete variables may be defined from system model description 124. For example, $N_d$ non-observed discrete variables may be defined.

In an operation 308, the valid values for each non-observed discrete variable are defined, for example, from system model description 124. For example, the $N_d$ non-observed discrete variables may have $d_1, d_2, \ldots, d_{N_d}$ valid values. The $d_i$, $i=1, \ldots, N_d$ values for each respective non-observed discrete variable may be defined sequentially and associated with a specific state. For example, a first value of a non-observed discrete variable may be zero indicating a non-fault state, and a second value of a non-observed discrete variable may be one indicating a fault state. There may be more than two valid values for any or all non-observed discrete variables.

In an operation 310, a second indicator of a minimum sequence duration value $s_{d,min}$ may be received. In an alternative embodiment, the second indicator may not be received. For example, a default value may be stored, for example, in computer-readable medium 108 and used automatically. In another alternative embodiment, the value of the minimum sequence duration value $s_{d,min}$ may not be selectable. Instead, a fixed, predefined value may be used. In an alternative embodiment, the minimum sequence duration value $s_{d,min}$ may be received for each non-observed discrete variable. For illustration, a default value for the minimum sequence duration value $s_{d,min}$ may be $s_{d,min}=20$ though other values may be used. For example, for a fault that can be identified in a single time period, $s_{d,min}=1$ may be used.

In general, the value of $s_{d,min}$ is selected to define a number of time periods to detect whether an event has occurred, such as a fault, associated with each non-observed discrete variable or all non-observed discrete variables if a single value is defined. The event may represent a change in state of the system described by system model description 124. Some events may be detected quickly while others may take a sequence of measurements to be detectable. For example, the effect of the changing states of the discrete variable on the values of the continuous variables may evolve slowly such that one time period is not enough to detect the shift in the probabilities of the state of the discrete variable. Because sensor measurements are typically noisy, it may take time before the measurements indicate the event occurrence. Because the number of time periods may vary based on the non-observed discrete variable, the value of $s_{d,min}$ may be specified for each non-observed discrete variable separately.

In an operation 312, a third indicator of a synchronization probability change value $\Delta p_{min}$ may be received. In an alternative embodiment, the third indicator may not be received. For example, a default value may be stored, for example, in computer-readable medium 108 and used automatically. In another alternative embodiment, the value of the synchronization probability change value $\Delta p_{min}$ may not be selectable. Instead, a fixed, predefined value may be used. In an alternative embodiment, the synchronization probability change value $\Delta p_{min}$ may be received for each non-observed discrete variable. For illustration, a default value for the synchronization probability change value $\Delta p_{min}$ may be $\Delta p_{min}=0.005$ though other values may be used. For example, values for the synchronization probability change value $\Delta p_{min}$ may be selectable between 0.001 and 1.0. The synchronization probability change value is used to indicate whether a value of the non-observed discrete variable is evolving or has stabilized to a specific value or state. To trigger synchronization each time period, $\Delta p_{min}=1.0$.

In an operation 314, initial values for each observed variable are read from observed values 126 or received from sensor 113 or from a computing device of distributed computing system 130. Defining the initial values for each observed variable may entail reading more than one row from observed values 126 or receiving more than one event in an event stream. For example, the event may be received in an event stream from an event publishing device that is part of distributed computing system 130.

For example, a Dynamic Bayesian Network action set described in SAS® Visual Data Mining and Machine Learning Programming Guide published Aug. 18, 2022 by SAS Institute Inc. (DBN action set) may be used to indicate/define the parameters of operations 300 through 314. The DBN action set describes how the network parameters may be input and the initial values may be defined. As already described, Bayesian networks consist of variables, which are represented as nodes, and relationships among these variables, which are represented as directed edges. The variables are a mix of hidden (non-observed) and observed variables. A dynamic Bayesian network (dynBnet) action in the Dynamic Bayesian Network action set computes probabilistic distributions of non-observed variables, given the values of observed variables. The action is referred to as dynamic because it is used to update the distributions of non-observed variables as new values of observed variables become available over time.

The dynamic nature of the problem is captured by modeling the Bayesian network over two time periods. Distributions of variables evolve from one time period to the next by using the relationships that are specified by directed edges in the network. Direction of an edge is specified as an arrow and connects a parent variable to a child variable. A child variable is a function of all parent variables, with arrows pointing from parents to children. A parent-child relationship never points backward in time; an arrow points to a child variable in either the same time period or the next time period. Conversely, a child variable is a function of parent variables in the same and/or a previous time period.

In an operation 316, a time branch is defined for each valid value of each non-observed discrete variable to create $N_b$ time branches, where $N_b = \Sigma_i^{N_d} d_i$. An indicator of the discrete variable and the value of the non-observed discrete variable may be associated with each respective time branch. Each time branch has an associated model that describes an evolution of a continuous variable over time. Combining the associated model with a value of one or more observed variables using Bayesian logic leads to a distribution over continuous variables at a specific time and a probability value that represents a likelihood that the associated value of the non-observed discrete variable is correct. Each model determines an outgoing belief (value) for the continuous variable at each time step.

For example, a history of the probabilities of the discrete variable branch for a rolling window of a size defined by the minimum sequence duration value $s_{d,min}$ is stored. At the end of each time period, the probabilities at the current time and the continuous variable beliefs associated with each time branch are also saved as output.

In an operation 318, the system model instantiated in operation 300 is executed with the initial value for each observed variable to define most probable values for each non-observed discrete variable and values for each non-observed continuous variable. For example, the instantiated system model may estimate a probability value $p_p[i,j]$, $i=1, \ldots, N_d$, $j=1, \ldots, d_i$, for the $i^{th}$ discrete variable with its $j^{th}$ value that is associated with each valid value of each non-observed discrete variable. Each time branch includes a distribution of the non-observed continuous variables specific to the $i^{th}$ discrete variable with its $j^{th}$ value. The model used to define a value for each respective non-observed continuous variable is selected based on the most probable branch, which has the highest probability value for the respective non-observed discrete variable. The selected model determines the belief for each non-observed continuous variable. For illustration, the Lauritzen and Spiegelhalter algorithm may be the filtering algorithm applied to update the belief in the value of each non-observed variable using the incoming beliefs from a previous time period and the values of observed variables at the current time. The Lauritzen and Spiegelhalter algorithm performs two passes over cliques in a clique tree to produce updated beliefs. The cliques are ordered in such a way that a clique is not processed until the incoming messages to the clique have been generated by the parent cliques of the clique.

In an operation 320, the current time c may be initialized based on a last time at which the initial values for each observed variable were initialized in operation 314.

In an operation 322, the most probable value for each non-observed discrete variable and/or the value for each non-observed continuous variable associated with the most probable value for each non-observed discrete variable may be output, for example, by storing to probable values dataset 126. In some cases, the probability associated with each of the non-observed discrete variables and/or the value of each non-observed continuous variable may be output based on user selection. The current time and/or the observed values may also be output. In addition, or in the alternative, the most probable values for each non-observed discrete variable and the values for each non-observed continuous variable may be presented on display 116, printed on printer 120, sent to another computing device using communication interface 106, sounded through speaker 118, etc. For example, one or more of the most probable values for each non-observed discrete variable and the values for each non-observed continuous variable may be streamed to an event subscribing device that is part of distributed computing system 130.

In an operation 324, belief values are synchronized for each time branch defined in operation 316 to have the same value for the respective non-observed continuous variable determined in operation 318.

In an operation 326, a sequence duration value $s_d$ is initialized for each non-observed discrete variable value. For example, each sequence duration value may be initialized to zero, $s_d[i]=0$, $i=1, \ldots, N_d$.

In an operation 328, new values for one or more observed variables are read from observed values 126 or received from sensor 113 or from a computing device of distributed computing system 130. Again, each observed variable may update at a different frequency or intermittently.

In an operation 330, the current time c is updated to the time that the new values were generated.

Similar to operation 318, in an operation 332, the system model instantiated in operation 300 is executed with the current values for each observed variable updated in operation 328. The instantiated system model projects the incoming beliefs associated with the non-observed values to the current time. Each time branch of the non-observed discrete variables is projected based on the new observed values and any previous non-observed values as defined in a previous time period based on the system model. To project the values for each time branch, the values of the other non-observed discrete variables are fixed to the most probable value as defined from the previous time period. Each time branch now includes an additional time period. The probability of each time branch at the current time $p_c[i,j]$, $i=1, \ldots, N_d$, $j=1, \ldots, d_i$ is computed using the observed value of the continuous variable, for example, as referenced in FIG. 2. Each time branch may result in the same or a different value for the non-observed continuous variable because the models are different.

In an operation 334, the estimated probability $p_c[i,j]$ of each time branch defines the probability of the value of the respective discrete variable, where each time branch includes a distribution of the non-observed continuous variables specific to the branch. The model used for each respective non-observed continuous variable is selected based on the most probable value for the non-observed discrete variables. For example, the non-observed continuous variable value defined by the model associated with the value h[i] is selected for the $i^{th}$ discrete variable based on having the highest estimated probability value, $$p_c[i, h[i]] = \max_{j=1,\ldots,d_i} (p_c[i, j]).$$

The selected model describes a time-based evolution of a respective non-observed continuous variable (child variable) to determine the updated value. Processing continues in an operation 340 shown referring to FIG. 3B.

In operation 340, a discrete variable is selected from the non-observed discrete variables. For example, a first non-observed discrete variable is selected from the non-observed discrete variables on a first iteration of operation 340 after operation 334; a second non-observed discrete variable is selected from the non-observed discrete variables on a second iteration of operation 340 after operation 334; etc. until each discrete variable of the non-observed discrete variables is selected in operation 340 after operation 334. For example, an index i may be initialized to one after operation 326 and before operation 340.

In an operation 342, the sequence duration value $s_d$ is incremented for the selected discrete variable and indicates a number of time periods elapsed since a previous synchronization for the time branches associated with the selected discrete variable. For example, $s_d[i]=s_d[i]+1$, where the index i indicates the selected discrete variable.

In an operation 344, a determination is made concerning whether the sequence is complete based on the value of $s_{d,min}$ that may be a single value or a value defined for each non-observed discrete variable, $s_{d,min}[i]$. When $s_d[i]<s_{d,min}$ or $s_d[i]<s_{d,min}[i]$ when a value is defined for each non-observed discrete variable, processing continues in an operation 346. When $s_d[i] \geq s_{d,min}$ or $s_d[i] \geq s_{d,min}[i]$, processing continues in an operation 348. When $s_d[i] \geq s_{d,min}$ or $s_d[i] \geq s_{d,min}$ [i], a sufficiently long sequence of time periods is included in the time branches associated with the selected discrete variable to evaluate whether the probabilities associated with each value of the selected discrete variable are evolving or have become stable. Allowing the change in the beliefs of non-observed continuous variables to accumulate over more time periods through longer time branches allows the transitioning value of one or more non-observed continuous variables to rise above the noise to detect a change in the probabilities of the levels of the non-observed discrete variable.

In operation 346, a determination is made concerning whether there is another discrete variable of the non-observed discrete variables that has not been selected. For example, when the index $i>N_d$, all of the discrete variables have been processed. When there is another discrete variable to select, processing continues in operation 340 to select the next discrete variable. When all of the non-observed discrete variables have been processed in operation 342, processing continues in an operation 362. The index i may be incremented after each discrete variable is processed through operations 342 through 360 and before operation 340 is performed again.

In operation 348, a probability change is computed for the selected discrete variable. As previously described, when the instantiated system model is executed, a probability is determined for each time branch. The probability indicates the likelihood that the discrete variable value of the associated time branch is correct. The change in probability for the selected discrete variable in a time period is calculated by computing a difference in probabilities at the current time c relative to the previous time period. This change in probability is computed as $$\Delta p[i] = \sqrt{\frac{1}{d_i}\sum_{l=1}^{d_i}(p_c[i,l]-p_p[i,l])^2}.$$

In an operation 349, the previous probability value $p_p[i, l]$ is updated for each valid value of the selected discrete variable to the current probability value, for example, using $p_p[i, l]=p_c[i, l]$, $l=1, \ldots, d_i$.

In an operation 350, a determination is made concerning whether the probability change exceeds $\Delta p_{min}$ that may be a single value or a value defined for each non-observed discrete variable $\Delta p_{min}[i]$. When $\Delta p[i]>\Delta p_{min}$ or $\Delta p[i]>\Delta p_{min}[i]$ when a value is defined for each non-observed discrete variable, processing continues in operation 356 because the value of the discrete variable is evolving and no synchronization is performed between the time branches of the selected discrete variable. When synchronization is not performed, a new time period is added to the time branch on a subsequent execution of the instantiated system model meaning that the beliefs in the values of the non-observed continuous variables at each time branch are retained. When $\Delta p[i] \leq \Delta p_{min}$ or $\Delta p[i] \leq \Delta p_{min}[i]$, processing continues in an operation 352.

In operation 352, belief values are synchronized for each time branch of the selected discrete variable to have the same value for the respective non-observed continuous variable associated with the time branch having the highest probability as defined by h[i], where h[i] is selected for the selected discrete variable indexed using i based on $$p_c[i, h[i]] = \max_{j=1,\ldots,d_i}(p_c[i,j]).$$

In an operation 354, the sequence duration value $s_d[i]$ is initialized for the selected discrete variable, for example, using $s_d[i]=0$, and processing continues in operation 356.

Figure 4:
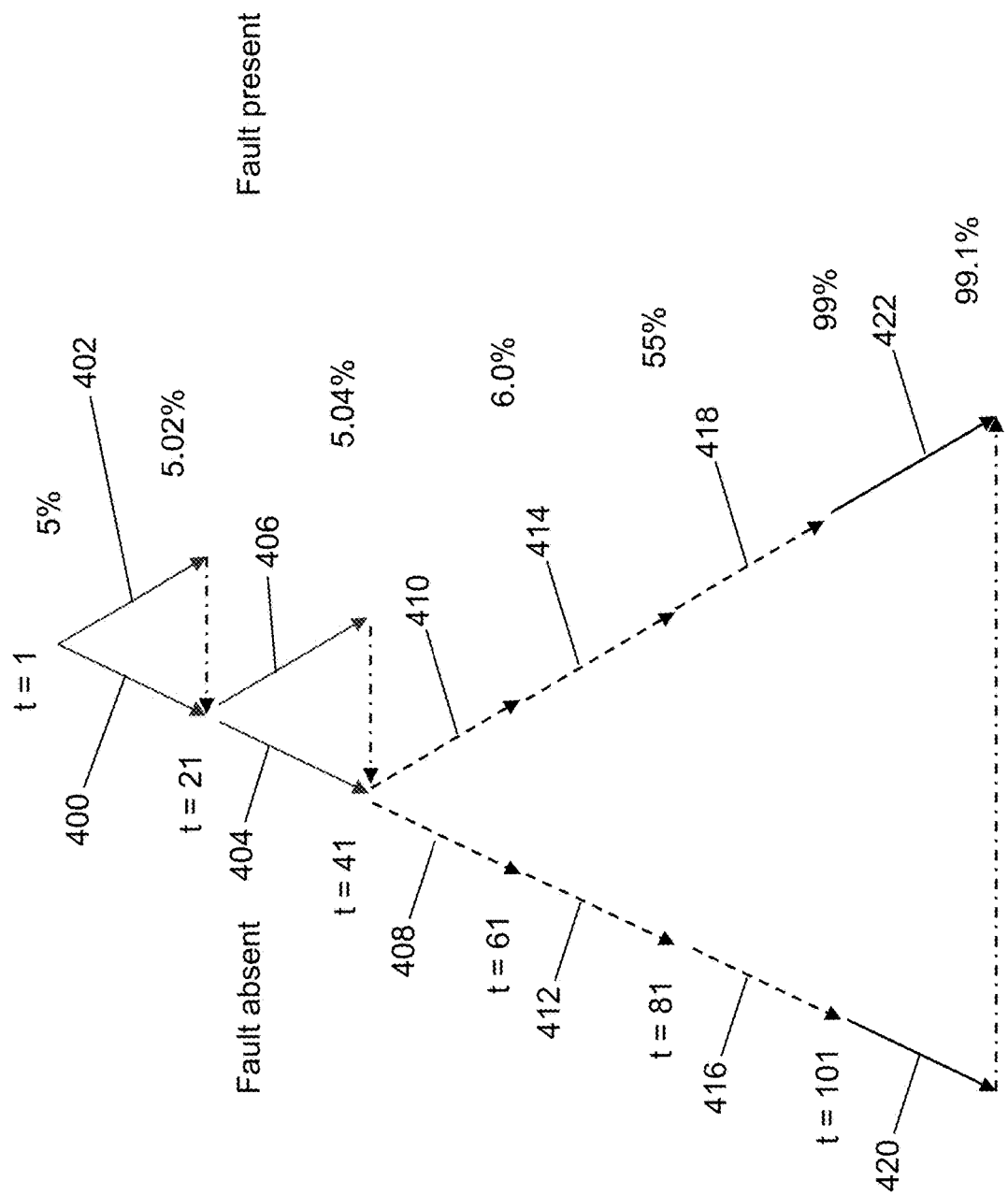
FIG. 4 shows a time branch evolution chart in accordance with an illustrative embodiment.

To illustrate application of $s_{d,min}$ and $\Delta p_{min}$ over operations 340 through 360, FIG. 4 shows a time branch evolution chart in accordance with an illustrative embodiment for a discrete variable with two valid values of fault absent and fault present. At a first time period t=1, a first time branch 400 for fault absent has a probability of 95% while a second time branch 402 for fault present has a probability of 5% at the outset. $s_{d,min}=20$ and $\Delta p_{min}=0.2$. After 20 iterations without synchronization of the pair of time branches, first time branch 400 for fault absent has a probability of 94.98% while a second time branch 402 for fault present has a probability of 5.02%. Each time branch represents an evolution in the value of the non-observed continuous variable based on the distinct models used. The change of probabilities for this discrete variable from the period $s_{d,min}$ prior to the current period is calculated to be 0.02 based on operation 348. Because 0.02≤0.2, the time branches are synchronized to the highest probability which is associated with first time branch 400 for fault absent. Because the probability of 5% for fault present is less than the probability of 95% for fault absent, the highest probability value for the discrete variable is fault absent. Models for continuous variables based on the fault being absent are used to define the value of the non-observed continuous variable.

After the next 20 iterations, a third time branch 404 for fault absent has a probability of 94.96% while a fourth time branch 406 for fault present has a probability of 5.04%. Because 0.02<0.2, the time branches are synchronized to the highest probability which is associated with third time branch 404 for fault absent.

After the next 20 iterations, a fifth time branch 408 for fault absent has a probability of 94% while a sixth time branch 410 for fault present has a probability of 6%. Because 0.96>0.2, the time branches are not synchronized and continue to evolve for a next 20 iterations.

After the next 20 iterations, a seventh time branch 412 for fault absent has a probability of 45% while an eighth time branch 414 for fault present has a probability of 55%. Because 49>0.2, the time branches are not synchronized and continue to evolve for a next 20 iterations. Because the probability of 55% for fault present is now greater than the probability of 45% for fault absent, the highest probability value for the discrete variable transitions to fault present from fault absent though the time branches continue to evolve separately.

After the next 20 iterations, a ninth time branch 416 for fault absent has a probability of 1% while a tenth time branch 418 for fault present has a probability of 99%. Because 44>0.2, the time branches are not synchronized and continue to evolve for a next 20 iterations.

After the next 20 iterations, an eleventh time branch 420 for fault absent has a probability of 0.9% while a twelfth time branch 422 for fault present has a probability of 99.1%. Because 0.1<0.2, the time branches are synchronized to the highest probability which is associated with twelfth time branch 422 for fault present. Both time branches now start from twelfth time branch 422.

The value of $s_{d,min}$ is selected to provide sufficient opportunity for detection of the change in the value of the continuous variable to be detected in individual time branches. The value of $\Delta p_{min}$ is selected to identify when there is conclusive evidence that a stable value of the probability of the discrete variable has been reached such that the time branches can be synchronized. Using synchronization, allows the beliefs of continuous variables to match the beliefs from the most probable branch of the associated discrete variable since that branch is now known to be the stable branch with highest probability. Synchronization of the beliefs of continuous variables helps because the continuous variable beliefs at the most probable discrete variable branch are the best beliefs for continuous variables. Allowing the continuous variable beliefs to separate over the discrete variable branches was necessary in detecting the evolution of continuous variables above their noise levels.

In operation 356, a determination is made concerning whether the value of more than one non-observed discrete variable changed value in operation 334 relative to its value at the end of the previous sequence as defined by the value of $s_{d,min}$. For example, in operation 334, a counter of a number of the non-observed discrete variables for which h[i] changed value relative to a value at the end of the previous sequence may be maintained. When the value of more than one non-observed discrete variable changed value relative to the previous sequence, processing continues in an operation 358. When the value of no or only one non-observed discrete variable changed value relative to the previous sequence, processing continues in operation 346.

Similar to operation 332, in operation 358, the system model instantiated in operation 300 is executed with the respective value h[i] for each non-observed variable updated in operation 334.

In an operation 360, the most probable value h[i] of each non-observed discrete variable is defined based on the discrete variable value associated with the highest probability branch determined after the system model execution in operation 358. The model used to determine the value for each respective non-observed continuous variable is selected based on the output of the model associated with the most probable value h[i] for each non-observed discrete variable.

Similar to operation 322, in operation 362, the most probable value for each non-observed discrete variable h[i] and/or the value for each non-observed continuous variable associated with the most probable value for each non-observed discrete variable may be output, for example, by storing to probable values dataset 126. In some cases, the probability associated with each of the non-observed discrete variables and/or the value of each non-observed continuous variable may be output based on user selection. The current time and/or the observed values may also be output. In addition, or in the alternative, the most probable values h[i] for each non-observed discrete variable and the associated values for each non-observed continuous variable may be presented on display 116, printed on printer 120, sent to another computing device using communication interface 106, sounded through speaker 118, etc. Processing continues in operation 328 until processing is stopped. For example, the system from which the observed values are being received may be stopped, which stops the generation of new observed values and execution of state monitoring application 122. As another example, all of the observed values stored in observed values dataset 126 may have been read, which stops execution of state monitoring application 122.

Figure 5A:
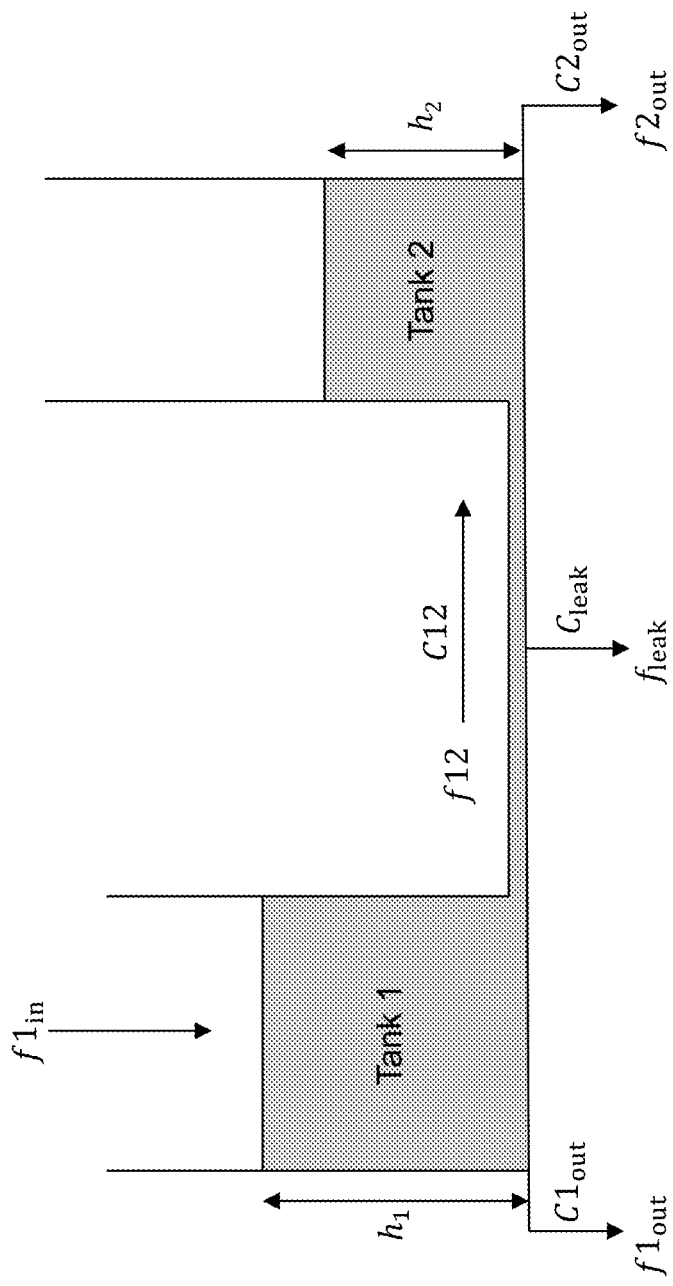
FIG. 5A depicts a two-tank system in accordance with an illustrative embodiment.

Referring to FIG. 5A, a two-tank system is shown with flows developed using a similar scenario of five tanks described in Lerner. The numerical values were generated using a simulation model for this two-tank scenario where:

$A_1$=cross-sectional area of tank 1
$A_2$=cross-sectional area of tank 2
$h_1$=height of liquid in tank 1
$h_2$=height of liquid in tank 2
$f1_{in}$=flow rate of liquid coming into tank 1
$f1_{out}$=flow rate of liquid going out of tank 1
$C1_{out}$=conductance (reciprocal of resistance) of pipe going out tank 1
$C12$=conductance of pipe connecting tank 1 to tank 2
$f12$=flow rate of liquid going from tank 1 to tank 2
$C_{leak}$=conductance of leak in pipe going from tank 1 to tank 2
$f_{leak}$=flow rate of leak in pipe going from tank 1 to tank 2
$C2_{out}$=conductance of pipe going out of tank 2
$f2_{out}$=flow rate of liquid going out of tank 2

A potential fault can occur as a leak in the pipe connecting tank 1 to tank 2. The leak grows increasing the value of the conductance of the leak $C_{leak}$ from 0 when there is no leak to 0.5 in 16 hours. Thus, the growing leak resulted in the loss of flow reaching tank 2. The flows $f1_{in}$, $f1_{out}$, and $f2_{out}$ were measured every minute. The fault grew slowly and the first few minutes of the effects caused by the leak tended to be within the noise of the flow measurements. The leak was introduced at the beginning of the simulation grew at the specified rate.

Figure 5B:
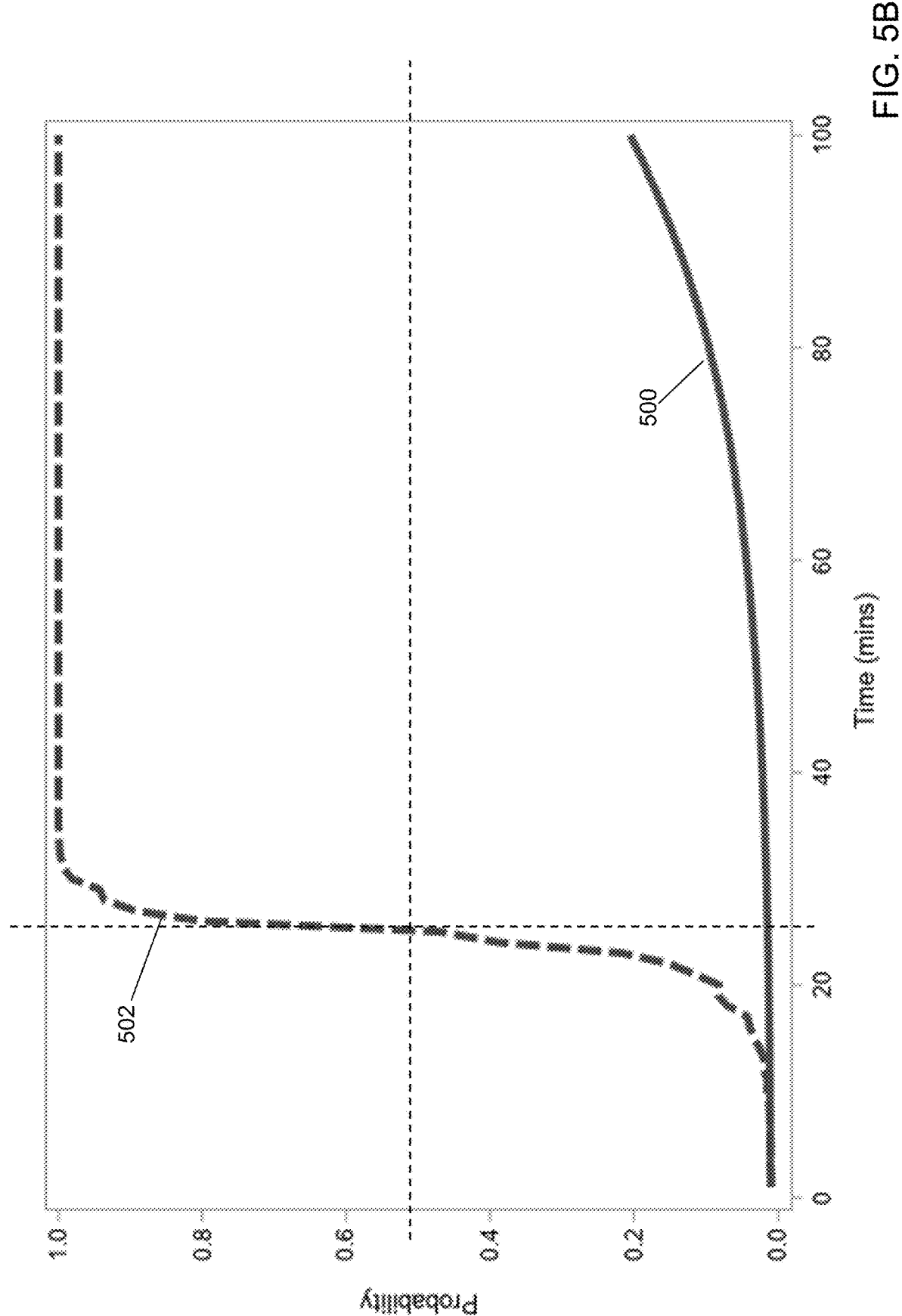
FIG. 5B depicts a fault probability comparison as a function of time simulating the two-tank system in accordance with an illustrative embodiment.

Referring to FIG. 5B, a fault probability comparison as a function of time simulating the two-tank system of FIG. 5A is shown in accordance with an illustrative embodiment. To create a first curve 500, state monitoring application 122 was executed with $s_{d,min}=1$ and $\Delta p_{min}=1$. To create a second curve 502, state monitoring application 122 was executed with $s_{d,min}=30$ and $\Delta p_{min}=0.005$. Because $s_{d,min}=1$ and $\Delta p_{min}=1$ results in synchronizing the beliefs at the end of each time period and carrying only the high probability belief forward, first curve 500 increases much slower. Because $s_{d,min}=30$ and $\Delta p_{min}=0.005$ allows the time branches to evolve, second curve 502 increases much more quickly to recognize the presence of the leak. For example, using $s_{d,min}=30$ and $\Delta p_{min}=0.005$, the presence of the leak was detected at t=26 minutes; whereas using $s_{d,min}=1$ and $\Delta p_{min}=1$, the presence of the leak was not detected in 100 minutes.

A chemical process as described in a paper by J. J. Downs and E. F. Vogel titled *A Plant-Wide Industrial Process Control Problem* and published in Computers & Chemical Engineering, Volume 17, Number 3 pages 245-255 in 1993 (Downs) was simulated using state monitoring application 122 on a network with a mix of non-observed continuous and discrete variables. The chemical process provides a realistic scenario with multiple disturbances affecting the operation as discussed on page 250 of Downs. The chemical process takes four input streams of chemicals (A, C, D, and E) and produces two products using a sequence of processors such as a reactor, a condenser, a compressor, a separator, and a stripper as shown in FIG. 1 on page 246 of Downs.

Twenty-two observed variables were measured every minute, fourteen variables were measured every six minutes, and five variables were measured every fifteen minutes resulting in 41 variables measured to assist in detecting the faults. Twenty faults or process disturbances were valid with two settings each of fault absent or fault present. Thus, the total number of fault states is defined as $2^{20}=1,048,576$. An exhaustive enumeration of branches in filtering logic is imvalid for this number of branches. State monitoring application 122 maintains only 2×20=40 time branches.

Two disturbances described in Downs were introduced in the process at the beginning of the simulation: 1) Process disturbance 4: Fault in reactor cooling water inlet temperature, and 2) Process disturbance 5: Fault in condenser cooling water inlet temperature.

Using state monitoring application 122, both process disturbance 4 and process disturbance 5 were detected in the same sequence and the system was updated using the second pass of operations 358 and 360. Table 1 below shows the results for process disturbance 4 with row one showing the incoming belief for process disturbance 4, with row two showing the computed beliefs for process disturbance 4 in operations 332 and 334, and with row three showing the computed beliefs for process disturbance 4 in operations 358 and 360.

TABLE 2

|  | Probability absent | Probability present |
|---|---|---|
| Before operation 332 | 0.056 | 0.944 |
| After operation 332 | 0.983 | 0.017 |
| After operation 358 | 0.999 | 0.001 |

The estimated probabilities are refined in the second pass based on inclusion of the presence of process disturbance 5.

Table 2 below shows the results for process disturbance 5 with row one showing the incoming belief for process disturbance 5, with row two showing the computed beliefs for process disturbance 5 in operations 332 and 334, and with row three showing the computed beliefs for process disturbance 5 in operations 358 and 360.

TABLE 2

|  | Probability absent | Probability present |
|---|---|---|
| Before operation 332 | 0.357 | 0.643 |
| After operation 332 | 0.820 | 0.180 |
| After operation 358 | 0.974 | 0.026 |

The estimated probabilities are refined in the second pass based on inclusion of the presence of process disturbance 4.

State monitoring application 122 has application in various processes including a manufacturing process, an industrial process, a mechanical process, a chemical process, an electrical process, a biological process, etc. Some or all of the operations of state monitoring application 122 may be performed by an ESPE that is receiving the observed values in an event stream from one or more event publishing devices. The outputs may be sent in another event stream to one or more event subscribing devices. The ESPE and/or the one or more event subscribing devices may generate an alert based on the value of one or more of the non-observed discrete variables.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are valid in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
define a time branch for each valid value of each discrete variable of a plurality of non-observed discrete variables, wherein an indicator of a discrete variable and a value of the discrete variable are associated with each respective time branch, wherein there are at least two valid values for each discrete variable of the plurality of non-observed discrete variables, wherein each time branch maintains a model of a value of a non-observed continuous variable of a plurality of non-observed continuous variables as a function of time based on the value of a respective discrete variable, wherein the non-observed continuous variable of the plurality of non-observed continuous variables and each discrete variable of the plurality of non-observed discrete variables are defined based on a statistical model;
initialize a sequence duration value for each discrete variable of the plurality of non-observed discrete variables;
(A) execute a system model with observed values of observed variables to update each time branch by projecting each non-observed continuous variable of the plurality of non-observed continuous variables based on the model of the non-observed continuous variable that is associated with each valid value of at least one discrete variable of the plurality of non-observed discrete variables, wherein the system model describes operation of a system and defines a relationship among the observed variables, the plurality of non-observed continuous variables, and the plurality of non-observed discrete variables, wherein execution of the system model determines a probability associated with each defined time branch that indicates a likelihood that the value of the discrete variable associated with each defined time branch is correct;

(B) define a discrete value for each non-observed discrete variable of the plurality of non-observed discrete variables as the valid value of the discrete variable associated with the defined time branch having a highest probability value among the probabilities determined for each discrete variable;

(C) define a continuous value for each non-observed continuous variable using the variable model associated with the defined time branch having the highest probability value;

(D) select a discrete variable from the plurality of non-observed discrete variables;

(E) increment the sequence duration value for the selected discrete variable;

(F) when the incremented sequence duration value is greater than a predefined minimum sequence duration value,
compute a probability change value for the selected discrete variable; and
when the computed probability change value is less than or equal to a predefined synchronization probability change value,
synchronize the continuous value for each non-observed continuous variable for each time branch of the selected discrete variable to have the continuous value defined in (C); and
reinitialize the sequence duration value for the selected discrete variable;

(G) repeat (D) through (F) with each remaining discrete variable of the plurality of non-observed discrete variables;

(H) output the defined continuous value for at least one non-observed continuous variable of the plurality of non-observed continuous variables;

(I) receive a new observed value for at least one observed variable of the observed variables;

repeat (A) through (I) with the received new observed value to replace a previous observed value of the observed values of at least one observed variable of the observed variables.

2. The non-transitory computer-readable medium of claim 1, wherein the system model is a dynamic Bayesian network model.

3. The non-transitory computer-readable medium of claim 1, wherein the system is selected from the group consisting of a manufacturing process, an industrial process, a mechanical process, a chemical process, an electrical process, and a biological process.

4. The non-transitory computer-readable medium of claim 1, wherein the observed values are received in an event stream from a second computing device.

5. The non-transitory computer-readable medium of claim 4, wherein the new observed value is received in the event stream from the second computing device.

6. The non-transitory computer-readable medium of claim 5, wherein repeating (A) through (I) is stopped when the event stream is stopped.

7. The non-transitory computer-readable medium of claim 1, wherein repeating (A) through (I) is stopped when the system is stopped.

8. The non-transitory computer-readable medium of claim 1, wherein the observed values are received by reading the observed values from a data file.

9. The non-transitory computer-readable medium of claim 8, wherein the new observed value is received by reading the new observed value from the data file.

10. The non-transitory computer-readable medium of claim 9, wherein repeating (A) through (I) is stopped once each observed value in the data file is read in (I).

11. The non-transitory computer-readable medium of claim 1, wherein at least one of the observed values is measured by a sensor mounted to measure a physical characteristic of the system.

12. The non-transitory computer-readable medium of claim 1, wherein the new observed value is measured by a sensor mounted to measure a physical characteristic of the system.

13. The non-transitory computer-readable medium of claim 1, wherein the defined discrete value is further output in (H) for at least one non-observed discrete variable of the plurality of non-observed discrete variables.

14. The non-transitory computer-readable medium of claim 1, wherein an alert is triggered when the defined discrete value for at least one non-observed discrete variable of the plurality of non-observed discrete variables indicates an event has occurred.

15. The non-transitory computer-readable medium of claim 14, wherein the event is occurrence of a fault in the system.

16. The non-transitory computer-readable medium of claim 1, wherein when the incremented sequence duration value is greater than the predefined minimum sequence duration value, the computer-readable instructions further cause the computing device to:
determine whether the defined discrete value of more than one discrete variable of the plurality of non-observed discrete variables changed value in (B) relative to a respective defined discrete value prior to a most recent prior occurrence when the incremented sequence duration value is greater than the predefined minimum sequence duration value; and
when the defined discrete value of more than one discrete variable of the plurality of non-observed discrete variables changed value based on the determination,
(J) execute the system model with the observed values of the observed variables and the discrete value for each non-observed discrete variable of the plurality of non-observed discrete variables defined in (B);
(K) define the discrete value for each non-observed discrete variable of the plurality of non-observed discrete variables as the valid value of the discrete variable associated with the defined time branch having the highest probability value as determined by execution of the system model in (J); and
(L) define the continuous value for each non-observed continuous variable using the model associated with the defined time branch having the highest probability value determined in (K).

17. The non-transitory computer-readable medium of claim 1, wherein the probability change value is computed using $$\Delta p[i] = \sqrt{\frac{1}{d_i}\sum_{l=1}^{d_i}(p_c[i,l] - p_p[i,l])^2},$$

where i indicates the selected discrete variable, $\Delta p[i]$ indicates the probability change value of the $i^{th}$ discrete variable, $d_i$ is a number of valid values of the selected discrete variable, $p_c[i,l]$ is the probability value of the defined time branch having a valid value of l for discrete variable i, and $p_p[i,l]$ is the probability value as determined by a previous execution of the system model in (A) for the defined time branch having the valid value of l for discrete variable i.

18. A computing device comprising:
a processor; and
a computer-readable medium operably coupled to the processor, the computer-readable medium having computer-readable instructions stored thereon that, when executed by the processor, cause the computing device to
define a time branch for each valid value of each discrete variable of a plurality of non-observed discrete variables, wherein an indicator of a discrete variable and a value of the discrete variable are associated with each respective time branch, wherein there are at least two valid values for each discrete variable of the plurality of non-observed discrete variables, wherein each time branch maintains a model of a value of a non-observed continuous variable of a plurality of non-observed continuous variables as a function of time based on the value of a respective discrete variable, wherein the non-observed continuous variable of the plurality of non-observed continuous variables and each discrete variable of the plurality of non-observed discrete variables are defined based on a statistical model;
initialize a sequence duration value for each discrete variable of the plurality of non-observed discrete variables;
(A) execute a system model with observed values of observed variables to update each time branch by projecting each non-observed continuous variable of the plurality of non-observed continuous variables based on the model of the non-observed continuous variable that is associated with each valid value of at least one discrete variable of the plurality of non-observed discrete variables, wherein the system model describes operation of a system and defines a relationship among the observed variables, the plurality of non-observed continuous variables, and the plurality of non-observed discrete variables, wherein execution of the system model determines a probability associated with each defined time branch that indicates a likelihood that the value of the discrete variable associated with each defined time branch is correct;
(B) define a discrete value for each non-observed discrete variable of the plurality of non-observed discrete variables as the valid value of the discrete variable associated with the defined time branch having a highest probability value among the probabilities determined for each discrete variable;
(C) define a continuous value for each non-observed continuous variable using the variable model associated with the defined time branch having the highest probability value;
(D) select a discrete variable from the plurality of non-observed discrete variables;
(E) increment the sequence duration value for the selected discrete variable;
(F) when the incremented sequence duration value is greater than a predefined minimum sequence duration value,
compute a probability change value for the selected discrete variable; and
when the computed probability change value is less than or equal to a predefined synchronization probability change value,
synchronize the continuous value for each non-observed continuous variable for each time branch of the selected discrete variable to have the continuous value defined in (C); and
reinitialize the sequence duration value for the selected discrete variable;
(G) repeat (D) through (F) with each remaining discrete variable of the plurality of non-observed discrete variables;
(H) output the defined continuous value for at least one non-observed continuous variable of the plurality of non-observed continuous variables;
(I) receive a new observed value for at least one observed variable of the observed variables;
repeat (A) through (I) with the received new observed value to replace a previous observed value of the observed values of at least one observed variable of the observed variables.

19. A method of monitoring a state of a system, the method comprising:
defining, by a computing device, a time branch for each valid value of each discrete variable of a plurality of non-observed discrete variables, wherein an indicator of a discrete variable and a value of the discrete variable are associated with each respective time branch, wherein there are at least two valid values for each discrete variable of the plurality of non-observed discrete variables, wherein each time branch maintains a model of a value of a non-observed continuous variable of a plurality of non-observed continuous variables as a function of time based on the value of a respective discrete variable, wherein the non-observed continuous variable of the plurality of non-observed continuous variables and each discrete variable of the plurality of non-observed discrete variables are defined based on a statistical model;
initializing, by the computing device, a sequence duration value for each discrete variable of the plurality of non-observed discrete variables;
(A) executing, by the computing device, a system model with observed values of observed variables to update each time branch by projecting each non-observed continuous variable of the plurality of non-observed continuous variables based on the model of the non-observed continuous variable that is associated with each valid value of at least one discrete variable of the plurality of non-observed discrete variables, wherein the system model describes operation of a system and defines a relationship among the observed variables, the plurality of non-observed continuous variables, and the plurality of non-observed discrete variables, wherein execution of the system model determines a probability associated with each defined time branch that indicates a likelihood that the value of the discrete variable associated with each defined time branch is correct;
(B) defining, by the computing device, a discrete value for each non-observed discrete variable of the plurality of non-observed discrete variables as the valid value of the discrete variable associated with the defined time branch having a highest probability value among the probabilities determined for each discrete variable;
(C) defining, by the computing device, a continuous value for each non-observed continuous variable using the variable model associated with the defined time branch having the highest probability value;
(D) selecting, by the computing device, a discrete variable from the plurality of non-observed discrete variables;
(E) incrementing, by the computing device, the sequence duration value for the selected discrete variable;
(F) when the incremented sequence duration value is greater than a predefined minimum sequence duration value,
  computing, by the computing device, a probability change value for the selected discrete variable; and
  when the computed probability change value is less than or equal to a predefined synchronization probability change value,
    synchronizing, by the computing device, the continuous value for each non-observed continuous variable for each time branch of the selected discrete variable to have the continuous value defined in (C); and
    reinitializing, by the computing device, the sequence duration value for the selected discrete variable;
(G) repeating, by the computing device, (D) through (F) with each remaining discrete variable of the plurality of non-observed discrete variables;
(H) outputting, by the computing device, the defined continuous value for at least one non-observed continuous variable of the plurality of non-observed continuous variables;
(I) receiving, by the computing device, a new observed value for at least one observed variable of the observed variables;
repeating, by the computing device, (A) through (I) with the received new observed value to replace a previous observed value of the observed values of at least one observed variable of the observed variables.

20. The method of claim 19, wherein the system model is a dynamic Bayesian network model.

21. The method of claim 19, wherein the system is selected from the group consisting of a manufacturing process, an industrial process, a mechanical process, a chemical process, an electrical process, and a biological process.

22. The method of claim 19, wherein the observed values are received in an event stream from a second computing device.

23. The method of claim 19, wherein repeating (A) through (I) is stopped when the system is stopped.

24. The method of claim 19, wherein the observed values are received by reading the observed values from a data file.

25. The method of claim 19, wherein at least one of the observed values is measured by a sensor mounted to measure a physical characteristic of the system.

26. The method of claim 19, wherein the new observed value is measured by a sensor mounted to measure a physical characteristic of the system.

27. The method of claim 19, wherein the defined discrete value is further output in (H) for at least one non-observed discrete variable of the plurality of non-observed discrete variables.

28. The method of claim 19, wherein an alert is triggered when the defined discrete value for at least one non-observed discrete variable of the plurality of non-observed discrete variables indicates an event has occurred.

29. The method of claim 19, further comprising, when the incremented sequence duration value is greater than the predefined minimum sequence duration value:
  determining, by the computing device, whether the defined discrete value of more than one discrete variable of the plurality of non-observed discrete variables changed value in (B) relative to a respective defined discrete value prior to a most recent prior occurrence when the incremented sequence duration value is greater than the predefined minimum sequence duration value; and
  when the defined discrete value of more than one discrete variable of the plurality of non-observed discrete variables changed value based on the determination,
    (J) executing, by the computing device, the system model with the observed values of the observed variables and the discrete value for each non-observed discrete variable of the plurality of non-observed discrete variables defined in (B);
    (K) defining, by the computing device, the discrete value for each non-observed discrete variable of the plurality of non-observed discrete variables as the valid value of the discrete variable associated with the defined time branch having the highest probability value as determined by execution of the system model in (J); and
    (L) defining, by the computing device, the continuous value for each non-observed continuous variable using the model associated with the defined time branch having the highest probability value determined in (K).

30. The method of claim 19, wherein the probability change value is computed using $$\Delta p[i] = \sqrt{\frac{1}{d_i}\sum_{l=1}^{d_i}(p_c[i,l] - p_p[i,l])^2},$$

where i indicates the selected discrete variable, $\Delta p[i]$ indicates the probability change value of the $i^{th}$ discrete variable, $d_i$ is a number of valid values of the selected discrete variable, $p_c[i,l]$ is the probability value of the defined time branch having a valid value of l for discrete variable i, and $p_p[i,l]$ is the probability value as determined by a previous execution of the system model in (A) for the defined time branch having the valid value of l for discrete variable i.

* * * * *